United States Patent [19]
Higham et al.

[11] Patent Number: 5,146,124
[45] Date of Patent: * Sep. 8, 1992

[54] LINEAR DRIVE MOTOR WITH FLEXIBLE COUPLING

[75] Inventors: Graham Higham, Scottsdale, Ariz.; Niels Young, Boise, Id.; Alan Weeks, Lunenburg, Mass.; Steven A. Michaud, Haverhill, Mass.; William Sand, Lexington, Mass.

[73] Assignee: Helix Technology Corporation, Mansfield, Mass.

[*] Notice: The portion of the term of this patent subsequent to Aug. 20, 2008 has been disclaimed.

[21] Appl. No.: 677,715

[22] Filed: Mar. 29, 1991

Related U.S. Application Data

[63] Continuation-in-part of Ser. No. 487,945, Apr. 6, 1990, Pat. No. 5,040,372, which is a continuation-in-part of Ser. No. 106,428, Oct. 8, 1987, Pat. No. 4,798,054.

[51] Int. Cl.$^5$ .............................................. H02K 33/16
[52] U.S. Cl. ............................................ 310/17; 62/6; 417/416; 417/437; 417/901
[58] Field of Search ....................... 310/15, 17; 60/520; 62/6; 417/340, 416, 417, 437, 496, 901

[56] References Cited

U.S. PATENT DOCUMENTS

| | | | |
|---|---|---|---|
| 4,300,873 | 11/1981 | Mowbray et al. | 417/416 |
| 4,501,120 | 2/1985 | Holland | 62/6 |
| 4,533,398 | 11/1985 | Young | 62/6 |
| 4,539,818 | 9/1985 | Holland | 62/6 |
| 4,545,209 | 10/1985 | Young | 62/6 |
| 4,578,956 | 4/1986 | Young | 62/6 |
| 4,644,851 | 2/1987 | Young | 92/127 |
| 4,798,054 | 1/1989 | Higham | 62/6 |
| 4,911,618 | 3/1990 | Suganami | 60/520 |
| 4,998,460 | 3/1991 | Wolfs et al. | 60/520 X |
| 5,040,372 | 8/1991 | Higham | 62/6 |

FOREIGN PATENT DOCUMENTS

| | | |
|---|---|---|
| US83/00322 | 3/1983 | PCT Int'l Appl. |
| US88/03523 | 10/1988 | PCT Int'l Appl. |
| 1112060 | 4/1967 | United Kingdom |

OTHER PUBLICATIONS

Breckenridge et al., "Rotary-Reciprocating Cryogenic Refrigeration System Studies", Part 1, Analysis, Technical Report (Sep. 1971).

Studer and Gasser, "A Bi-directional Linear Motor/Generator with Integral Magnetic Bearings for Long Lifetime Stirling Cycle Refrigerators", (May 1981).

Longsworth, "Split Stipling Cycle Cryogenic Refrigerator", (Feb. 1974).

"The Design and Development of a Miniature Split Stirling Refrigerator", Final Engineering Report, Night Vision Laboratory, Fort Belvoir, Virginia (Apr. 1976).

Sullivan and Zimmerman, "Very Low-Power Stirling Cryocoolers Using Plastic and Composite Materials", vol. 2, No. 6 (Nov. 1979).

Primary Examiner—Steven L. Stephan
Assistant Examiner—Judson H. Jones
Attorney, Agent, or Firm—Hamilton, Brook, Smith & Reynolds

[57] ABSTRACT

A linear drive motor of a cryogenic refrigerator, where a reciprocating armature is coupled to a piston which alternately compresses and expands a gaseous fluid in a thermodynamic cycle. The piston has a clearance seal and is attached at one end to a flexible coupling to reduce cross-bearing loads exerted by the piston along the clearance seal. A displacer assembly of the cryogenic refrigerator employs a displacer piston that reciprocates along a clearance seal. The displacer piston is coupled to the displacer cylinder and/or the armature of a displacer drive motor by a flexible coupling that reduces radial forces exerted by the displacer piston on the clearance seal.

37 Claims, 13 Drawing Sheets

LINEAR DRIVE MOTOR WITH FLEXIBLE COUPLING

This is a continuation-in-part application of U.S. Ser. No. 07/487,945 filed on Apr. 6, 1990, now U.S. Pat. No. 5,040,372, which takes priority from International Application No. PCT/US88/03523 filed on Oct. 6, 1988, which is a continuation-in-part of U.S. Ser. No. 07/106,428 filed on Oct. 8, 1987, now U.S. Pat. No. 4,798,054.

BACKGROUND OF THE INVENTION

This invention relates to cryogenic refrigerators such as split Stirling cryogenic refrigerators. In particular, it relates to small refrigeration systems having compressors driven by linear motors.

Conventional split Stirling refrigerators usually include a reciprocating compressor and a displacer in a cold finger removed from that compressor. The piston of the compressor is mechanically driven to provide a nearly sinusoidal pressure variation in the pressurized refrigeration gas. The refrigeration gas is usually helium. This pressure variation is transmitted through a supply line to the displacer in the cold finger.

Typically, an electric motor drives the compressor through a crankshaft which is rotatably secured to the compressor. The compressing movement of the compressor causes pressure in the working volume to rise from a minimum pressure to a maximum pressure and, thus, warm the working volume of gas. Heat from the warmed gas is transferred to the environment so that the compression at the warm end of the cold finger is near isothermal The high pressure creates a pressure differential across the displacer in the cold finger which, when retarding forces are overcome, is free to move within the cold finger. With the movement of the displacer, high pressure working gas at about ambient pressure is forced through a regenerator and into a cold space. The regenerator absorbs heat from the flowing pressurized refrigerant gas and thus reduces the temperature of the gas.

As the compressor piston reverses direction begins to expand the volume of gas in the working space, the high pressure helium in the displacer is cooled even further. It is this cooling in the cold end of the displacer which provides refrigeration for maintaining a time average temperature gradient of over 200 Kelvin over the length of the regenerator.

At some point the decrease in pressure caused by expanding movement of the piston drops sufficiently to overcome retarding forces on the displacer in the cold finger. This causes the displacer to be returned to its starting position. Cold gas from the cold end of the cold finger is driven once again through the regenerator and extracts heat therefrom.

Recently, refrigerators have been proposed and manufactured that depend on linear motors to control the movement of the piston or pistons in the compressor and to control movement of the displacer. The systems use clearance seals between hard ceramic and/or cermet pistons and cylinder liners. An example is disclosed in U.S. Pat. No. 4,545,209, filed by Niels Young on Jan. 17, 1983.

A goal of such linear refrigerators is long life and reduced wear as must be provided for advanced aircraft and spacecraft.

DISCLOSURE OF THE INVENTION

The present invention relates to several improvements in linear drive motors used in compressors and/or displacers of cryogenic refrigerators.

A stationary piston, about which a reciprocating armature moves to compress and expand a gaseous fluid is attached at one end to a housing. The housing hermetically seals the volume in which the armature reciprocates. A clearance seal between the armature and the stationary piston is positioned along a head portion of the piston. This head portion is attached at one end to the housing by a flexible stem which permits the longitudinal axis of the piston head to bend when it is exposed to radial forces. This permits the stationary piston to remain in alignment with the armature along the clearance seal even when the armature motion is slightly skewed off the longitudinal axis of the compressor.

The flexible stem can be formed by machining a portion of a cylindrical rod to the appropriate dimensions, or alternatively, by attaching the piston head to a tube secured to the housing. The embodiment employing a tubular stem provides for a longer stem without the costs of machining incurred in the integral stem embodiment.

Two supports are provided at opposite ends of the volume in which the armature reciprocates to prevent cross bearing forces exerted along the clearance seal by the armature.

Each support is comprised of a sleeve that is at least partially concentric about one end of the armature throughout the armature cycle. Each sleeve operates to retain the armature along a linear path and insure even loading along the clearance seal. The longitudinal axis of each sleeve is permitted to skew slightly with respect to the compressor axis. However, springs which attach each sleeve to the housing tend to urge the sleeve, and consequently the armature, back into alignment with the compressor axis.

Another embodiment employs a spring mounted sleeve to support the end of the armature adjacent the more flexible head portion of the piston and uses a springless mount for the second sleeve to support the end of the armature nearest to the end of the housing where the piston is mounted. The end of the piston that is mounted to the housing undergoes a smaller radial displacement than the free end of the piston upon the application of some radial force. The springless sleeve provides a stiff support to the end of the armature reciprocating over the less flexible portion of the piston. Thus the spring constant of the two sleeve mounts can be different depending upon the variation in the radial displacement of the piston over the clearance seal.

The invention thus uses the spring action within the flexible stem of the piston and within the spring mounted sleeves to reduce uneven load distribution along the clearance seal between the armature and the stationary piston head. This results in a linear drive system having reduced wear and a longer lifetime.

A preferred embodiment of the invention employs an isolation system for a linear drive motor where the housing of the motor is mounted to a frame with a number of machined isolator springs. The axial and radial stiffness of these machined springs can be more carefully controlled than conventional coiled springs. The springs are machined in such a way as to provide a stiff spring in the radial direction and a soft spring in the axial direction which is parallel to the axis of the linear drive motor. The compressor of the refrigerator is connected to a cold finger in which a displacer is coupled to a displacer piston by a flexible coupling that provides universal radial compliance between these two components to reduce radial forces exerted by the displacer piston on the clearance seal along which the displacer piston reciprocates.

The compressor of the refrigerator can also employ a reciprocating piston that is coupled to the armature of linear drive motor by a flexible piston coupling. The compressor can be either a single piston embodiment employing a dynamic absorber or a dual piston embodiment employing a centrally positioned compression space. Both pistons utilize flexible piston couplings to reduce loads on the clearance seals formed with the cylinders in which the pistons reciprocate.

The refrigerator can also include a cold finger in which the displacer is coupled to a displacer piston by a flexible coupling. Another preferred embodiment utilizes a cold finger with a linear drive motor to drive the displacer. The armature that is driven by the motor is coupled to the displacer piston with another flexible coupling to further reduce radial loads being exerted on the clearance seal formed with the displacer piston.

Both the compressor and the displacer can utilize an air gap bearing to support the reciprocating armature relative to the housing. The air gap bearing serves to replace the flexure support bearings used in other embodiments. The air gap bearing includes a sleeve that can either be secured to the inner cylindrical wall of the housing that is concentric about the armature or the sleeve can be secured to the outer cylindrical surface of the armature. In either case, this sleeve support bearing forms a "soft on hard" bearing surface where the sleeve comprises a plastic material that will exhibit reduced friction and wear due to its motion relative to the metal surface against which it slides. Such a "soft on hard" bearing can also be employed on the clearance seals in both the compressor and the displacer.

The above, and other features of the invention, including various novel details of construction and combination of parts, will now be more particularly described with reference to the accompanying drawings and pointed out in the claims. It will be understood that the particular cryogenic refrigerator system utilizing linear drive motors with bearing supports and flexible piston couplings embody that invention as shown by the way of illustration only and not as a limitation of invention. The principle features of this invention can be employed in various embodiments without departing from the scope of the invention.

DETAILED DESCRIPTION OF THE INVENTION

Figure 1:
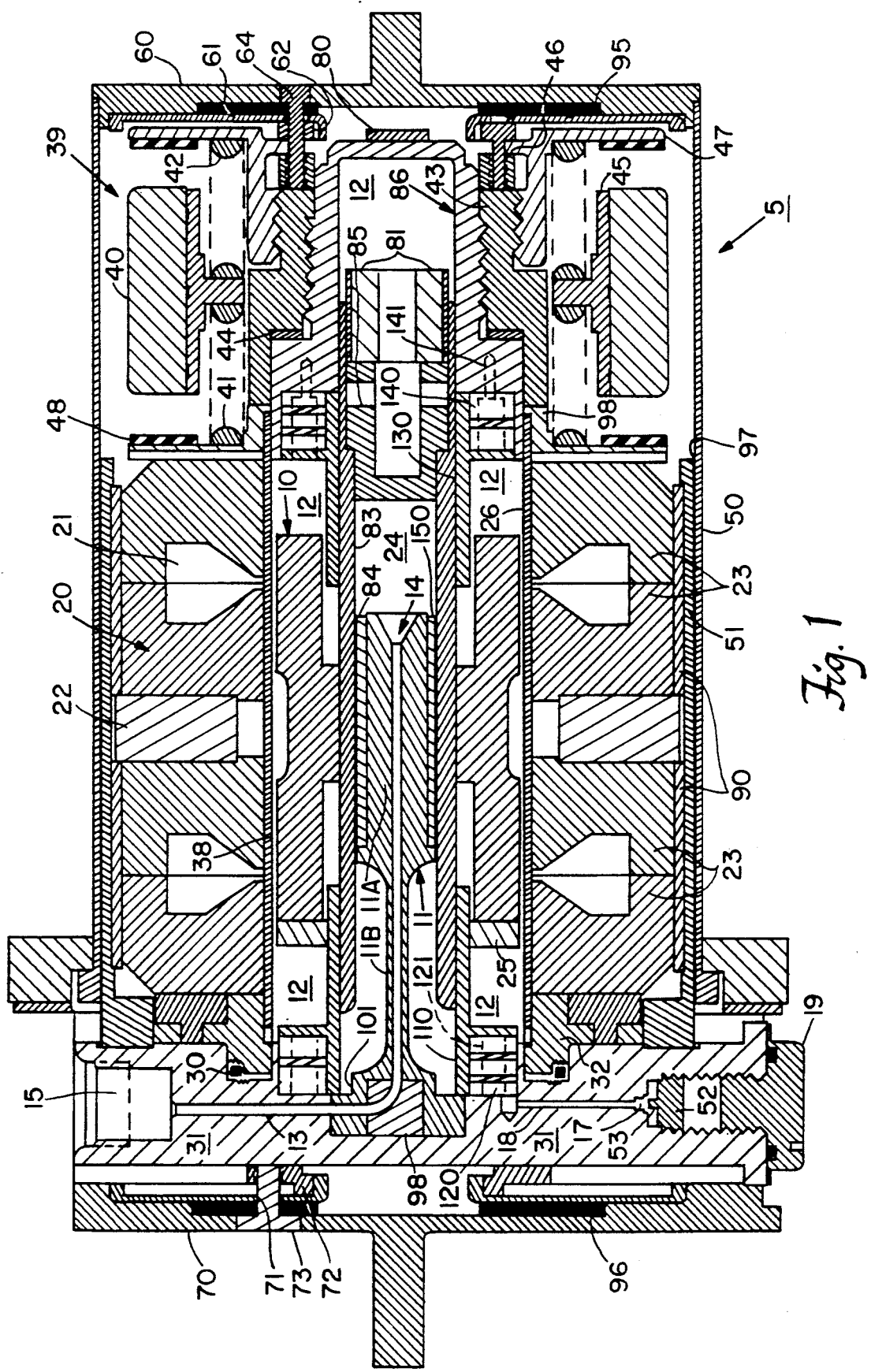
FIG. 1 is a cross-sectional view of a linear drive assembly of a helium cryogenic refrigerator of the present invention.

A linear drive assembly of a helium cryogenic refrigerator utilizing a flexure bearing support and flexible piston stem of the present invention is illustrated in FIG. 1. The linear motor utilizes an involute laminated stator 20 first disclosed in U.S. patent application Ser. No. 885,218, of G. Higham et al. filed Jul. 14, 1986 entitled "Cryogenic Refrigeration System Having an Involute Laminated Stator for its Linear Drive Motor."

As shown in FIG. 1, this compressor 5 comprises a reciprocating armature 10 which compresses helium gas in a compression head space 24. From the compression space 24 the gas passes through a port 14 in the stationary piston 11 to pre-formed bores through the piston 11, insert 98, and plate 31 to form conduit 13. Conduit 13 runs along the core of stationary piston 11, then curves at a right angle in insert 98 to a gas fitting assembly 15. From the gas fitting assembly 15, gas is delivered to a cold finger of a cryogenic refrigerator such as a split Stirling refrigerator in which a displacer is housed as disclosed in U.S. Pat. No. 4,545,209. The stationary piston 11 is comprised of a piston head 11A along the length of a clearance seal 150 with the armature 10, and a flexible stem 11B which connects the piston head 11A to the housing plate 31.

Plate 31 provides for a lead ball 53 and retainer screw 52 for sealing the port 17. The compressor is charged with helium gas through the port 17. The gas is allowed to communicate with an armature volume 12 of the piston cylinder through port 16 which is in communication with a second pre-formed conduit 18. During the compressor operation, however, the ball 53 is fixed against the plate 31 by the retainer screw 52 to close the port 17. A protective dust cover screw 19 is provided to prevent dirt and debris from entering the ball 53 and screw 52 seal.

The armature 10 comprises an iron mass 38 fixed to a liner core 83. Iron is used because of its high magnetic permeability and high magnetic induction; however, other materials having the same characteristics may be used. A tungsten alloy ring or other high density, non-magnetic material 25 may be incorporated at one end of the armature to give more mass to adjust the resonant frequency of operation and offset the mass of the target magnet 81 so that the center of gravity of the armature is centrally located. In order to detect the position of the armature a sensor 80 is used to detect the target magnet 81 fitted at one end of the armature 10. The magnet 81 is mounted on a non-magnetic extended cylinder 85 that oscillates within an extension 86 of the armature housing 26 during motor operation. The end plate of cylinder 85 also forms compression space 24 in conjunction with cylinder 82. By isolating the magnet 81 and sensor 80 away from the stator 20, the magnetic field of magnet 80 is decoupled from the magnetic field of the stator magnet 22. Preferably, the armature 10 is fitted with a ceramic cylinder 83 to provide a clearance seal with the stationary piston 11. A cermet material 84 is mounted on the piston 11 to form part of the clearance seal.

Surrounding the armature 10 just described is a pressure housing 26. The size of the pressure housing is constructed to allow helium gas in the working volume 12 to flow freely between the pressure housing 26 and the iron mass 38 as the armature 10 shuttles back and forth.

A stator 20 is located around the perimeter of the pressure housing 26. The stator 20 comprises two coils 21 positioned between involute laminations 23 and separated by a magnet 22. This static assembly is further described in U.S. Ser. No. 885,218 by G. Higham et al. recited above, which is incorporated herein. Two shields 90 have been concentrically disposed about the involuted laminations 23 to convey the magnetic flux lines along the inside wall 51 of the housing 50.

As a consequence of the armature 10 reciprocating back and forth, mechanical vibrations are produced by the compressor 5. To eliminate the vibrations, a passive vibration absorber or dynamic absorber 39 is attached to one end of the compressor and is tuned to resonate at the same frequency as the compressor's operating frequency. Preferably, the dynamic absorber 39 comprises a counterbalance mass 40 mounted with supporting ring 45 between two springs 41 and 42 having small damping characteristics. As a result, the axial motion of the compressor is countered by the axial vibration from the counterbalance mass 40 of the absorber 39. A further description of dynamic absorber operation is found in U.S. Ser. No. 894,777, G. Higham et al. filed Aug. 8, 1986, entitled "A Vibration Isolation System for a Linear Reciprocating Machine."

The present invention utilizes isolators 61 and 71 mounted on the opposite ends of the compressor. The two isolators are comprised of flat spiral springs 61 and 71 which are soft in the axial direction while being very stiff in the radial direction. The outer diameter of the two springs 61 and 71 are attached to the housing end plates 60 and 70 respectively. The springs are mounted onto flanges 62 and 72 and in turn attached to screw flanges 46 and 72 respectively using bolts 64 and 73. The isolators are mounted on elastomeric material 95 and 96 located at both ends of compressor 5 providing a substantial level of damping to the isolator system. Grease is applied to the wall 51 to help remove heat from the stator 20 while providing damping of internal vibration of the compressor. A soft metallic gasket 30 is configured between the plate 31 and flange 32 to seal the armature volume 12 of the linear drive unit from the external atmosphere.

In FIG. 1, there are two cylindrical sleeves 110 and 130 configured at opposite ends of the armature volume such that the inner core 83 of armature 10 is supported by these sleeves, while the armature reciprocates.

The sleeves 110 and 130 are mounted onto plate 31 and housing extension 86 by two coiled springs 120 and 140 respectively and flanges radially extending from the sleeves.

Figure 3:
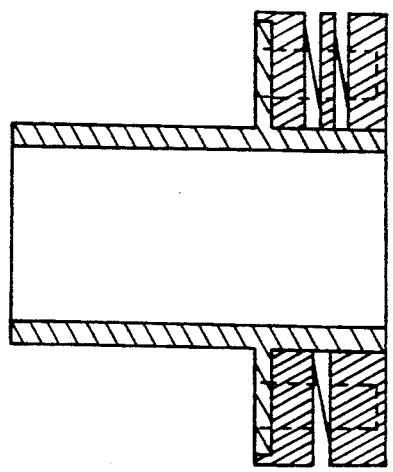
FIG. 3 illustrates a magnified cross-sectional view of a flexure bearing support of the present invention.

FIG. 3 is a magnified cross-sectional view of the sleeve 130 and spring 140.

Figure 4:
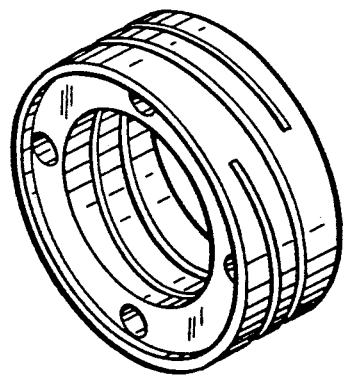
FIG. 4 illustrates a perspective view of the spring of the above flexure bearing support.

FIG. 4 illustrates a perspective view of the spring 140. Bolts 121 and 141 are used to mount the flanges and springs to their respective housing elements. The springs 120 and 140 are flexible to permit a slight skewing of the longitudinal axis of each sleeve 110 and 130. Thus, if the armature is slightly skewed the sleeve supports will tend to realign the armature along the compressor axis.

The flexible stem 11B of the stationary piston 11 works in conjunction with the flange supports to permit the skewing of the armature while maintaining even loading along the clearance seal 150. The stiffness of stem 11B, along with springs 120 and 140 operate to support the armature 10 and maintain proper alignment between the piston 11 and armature 10 to minimize wear along the seal 150.

Figure 2:
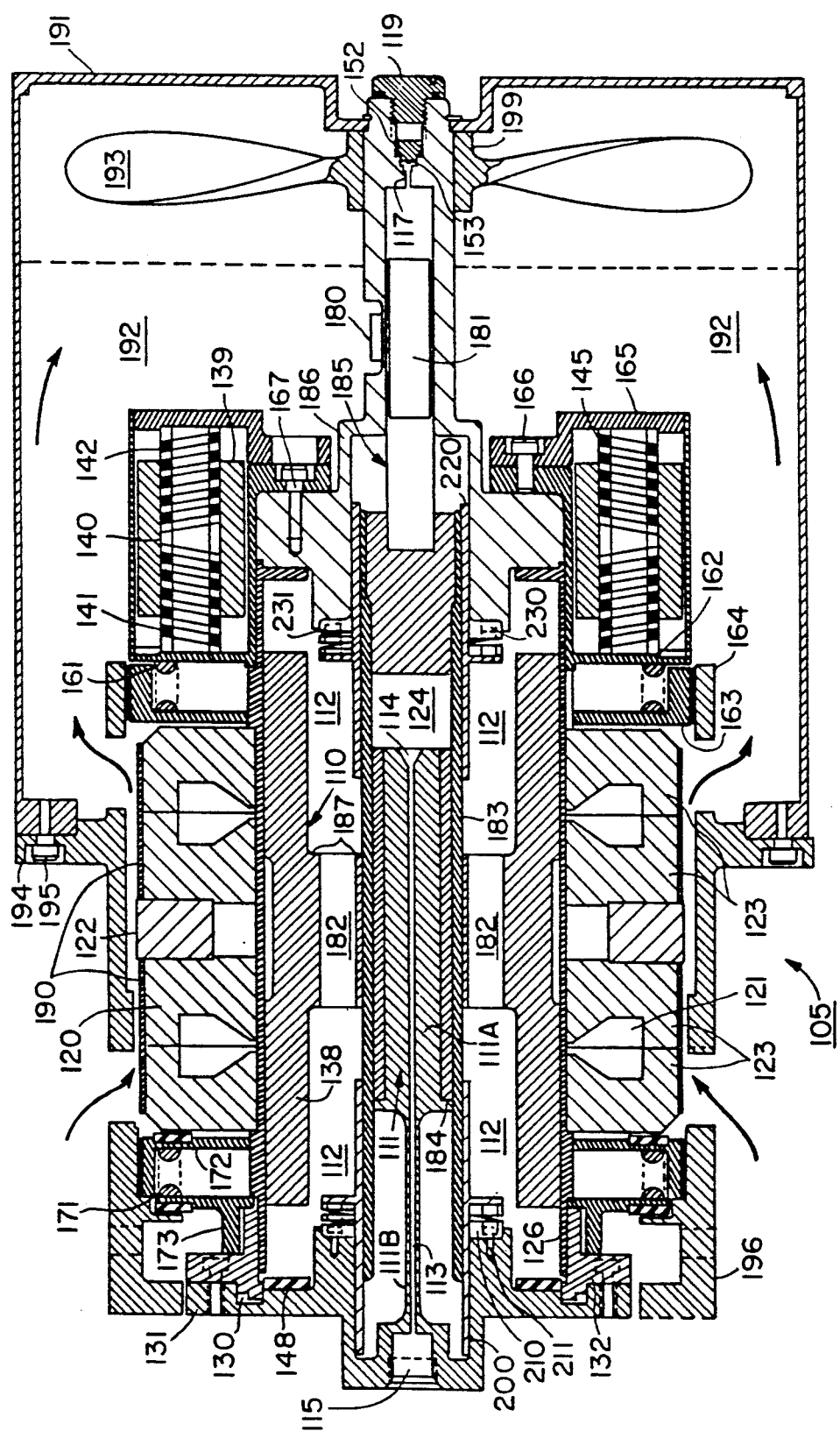
FIG. 2 is a cross-sectional view of a further preferred embodiment of a linear drive assembly of a helium cryogenic refrigerator using a flexible bearing support.

Another preferred embodiment of the invention is shown in the linear drive assembly of FIG. 2.

As shown in FIG. 2, this compressor 105 comprises a reciprocating armature 110 which compresses helium gas in a compression head space 124. From the compression space 124 the gas passes through a port 114 in the stationary piston 111 to pre-formed bores through the piston 111 and plate 131 to form conduit 113. Conduit 113 runs along the core of stationary piston 111 to a gas fitting assembly 115.

The armature housing extension 186 provides for a lead ball 153 and retainer screw 152 for sealing the port 117. The compressor is charged with helium gas through the port 117. During the compressor operation the ball 153 is fixed against the housing portion 186 by the retainer screw 152 to close the port 117. A protective dust cover screw 119 is provided to prevent dirt and debris from entering the ball 153 and screw 152 seal.

As in FIG. 1, the armature 110 of FIG. 2 comprises an iron mass 138 fixed to a liner core 183. A sensor 180 to detect the position of the armature is mounted on the housing extension 186 to detect a target magnet 181 fitted at one end of the armature 110. The magnet 181 is mounted on a non-magnetic extended cylinder 185 that oscillates within an extension 186 of the armature housing 126 during motor operation. By isolating the magnet 181 and sensor 180 away from the stator 120, the magnetic field of magnet 180 is decoupled from the magnetic field of the stator magnet 122. Preferably, the armature 110 is fitted within a ceramic cylinder 183 to provide a clearance seal with the stationary piston 111. A cermet material 184 is mounted on the piston 111 to form part of the clearance seal.

As in the system of FIG. 1, to eliminate the mechanical vibrations of the system, a passive vibration absorber or dynamic absorber 139 is attached to one end of the compressor and is tuned to resonate at the same frequency as the compressor's operating frequency. Preferably, the dynamic absorber 139 comprises a counterbalance mass 140 mounted between two sections 141 and 142 of a single spring 145 having small damping characteristics. The mass 140 is affixed to spring 145 at the center yet permits full compression and extension of the spring sections 141 and 142. As a result, the axial motion of the compressor is countered by the axial vibration from the counterbalance mass 140 of the absorber 139.

The present embodiment utilizes isolators mounted on opposite ends of the compressor. The two isolators are comprised of springs 161 and 171 which are soft in the axial direction while being very stiff in the radial direction. The outer end of the two springs 161 and 171 are attached to the housing flanges 162 and 132 respectively. The inner ends are mounted onto flanges 163 and 172. The isolators are mounted on elastomeric material and located at one end of compressor 105 providing a substantial level of damping to the isolator system. Grease is applied to the wall to help remove heat from the stator 120 while providing damping of internal vibration of the compressor. A soft metallic gasket 130 is configured between the plate 131 and flange 132 to seal the armature volume 112 of the linear drive unit from the external atmosphere.

The two sleeves 200 and 220 of FIG. 2, along with the springs 210 and 230 operate much the same as the flexure supports of the system in FIG. 1. The flexible stem 111B of the stationary piston 111 works in conjunction with the flange supports 200 and 220, and springs 210 and 230, to minimize wear along the clearance seal.

Figure 5:
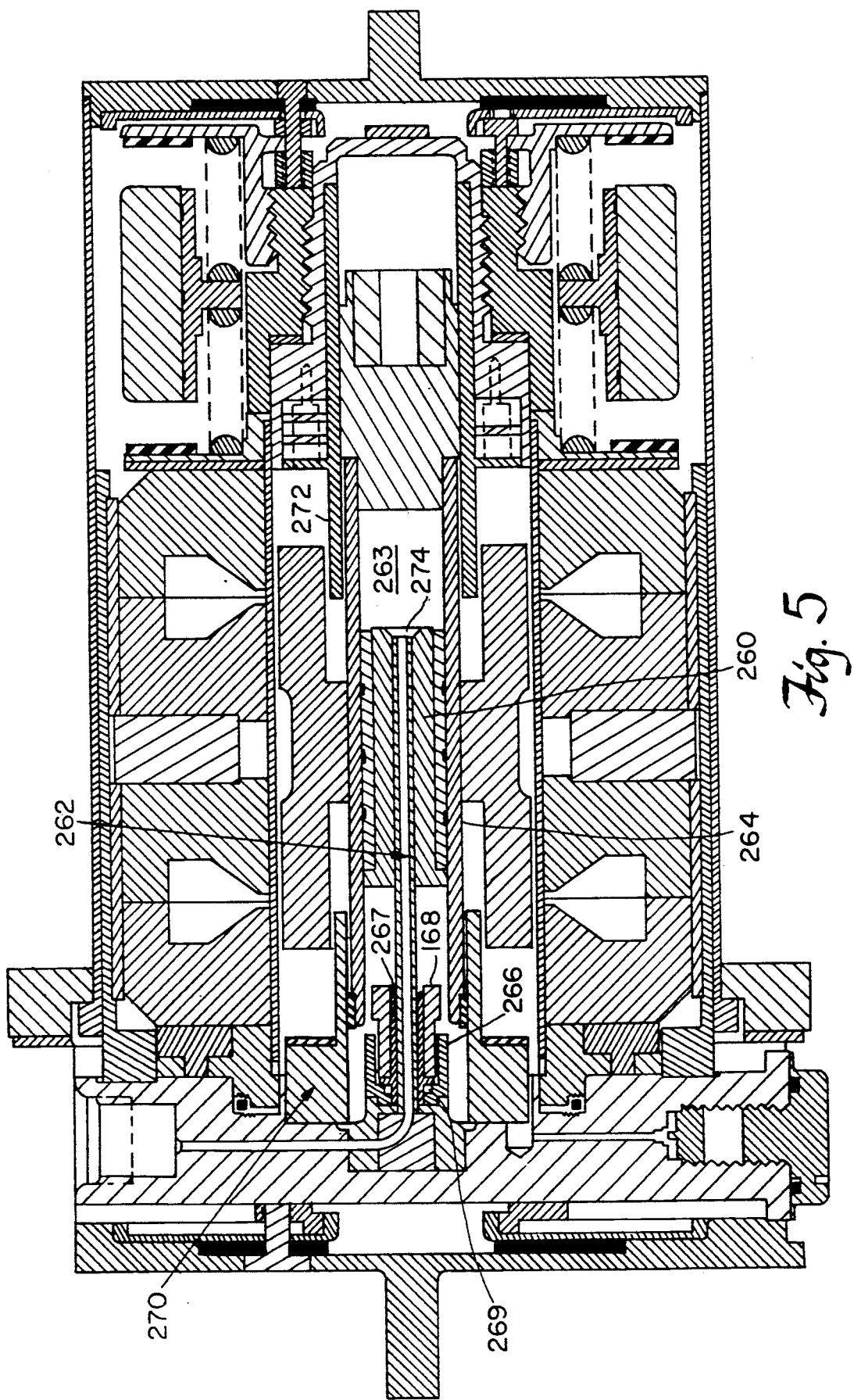
FIG. 5 is a cross-sectional view of another preferred embodiment of a linear drive assembly employing a tubular quill stationary piston.

Another preferred embodiment for a linear drive system is shown in the cross-sectional view of FIG. 5. The stationary piston 260 of this embodiment is mounted to the housing of the linear drive motor using a tubular quill 262 instead of the integrally formed quill 11B of FIG. 1. The tubular mount for the piston 260 eliminates the machining necessary to form the flexible quill portion of the piston. The tube 262 also replaces the axial bore used to transport the pressurized fluid from the compression space 263 to the cold end of the refrigerator. The tube is brazed to the inside wall of the axial bore 265 within the piston 260. The tube 262 is mounted to the housing by means of a ferrule 267 brazed to the exterior of the tube and is retained against the front flange 266 by ferrule 267 and the flange 266 to seal the interior of the housing.

The front bearing spring support 270 of this embodiment is stiff rather than flexible as in the embodiment of FIG. 1. A flexible bearing support 272 is used at the flexible end 274 of the stationary piston 260 to guide the armature 264. Thus the end of the armature traversing the stiff end of the piston is supported by the stiff bearing support 270. The portion of the armature traversing the radially flexible end 274 of the piston 260 is supported by the flexible spring mounted bearing support 272. This configuration optimizes support while minimizing friction at the free end of the piston that is subject to greater radial loads.

Figure 6:
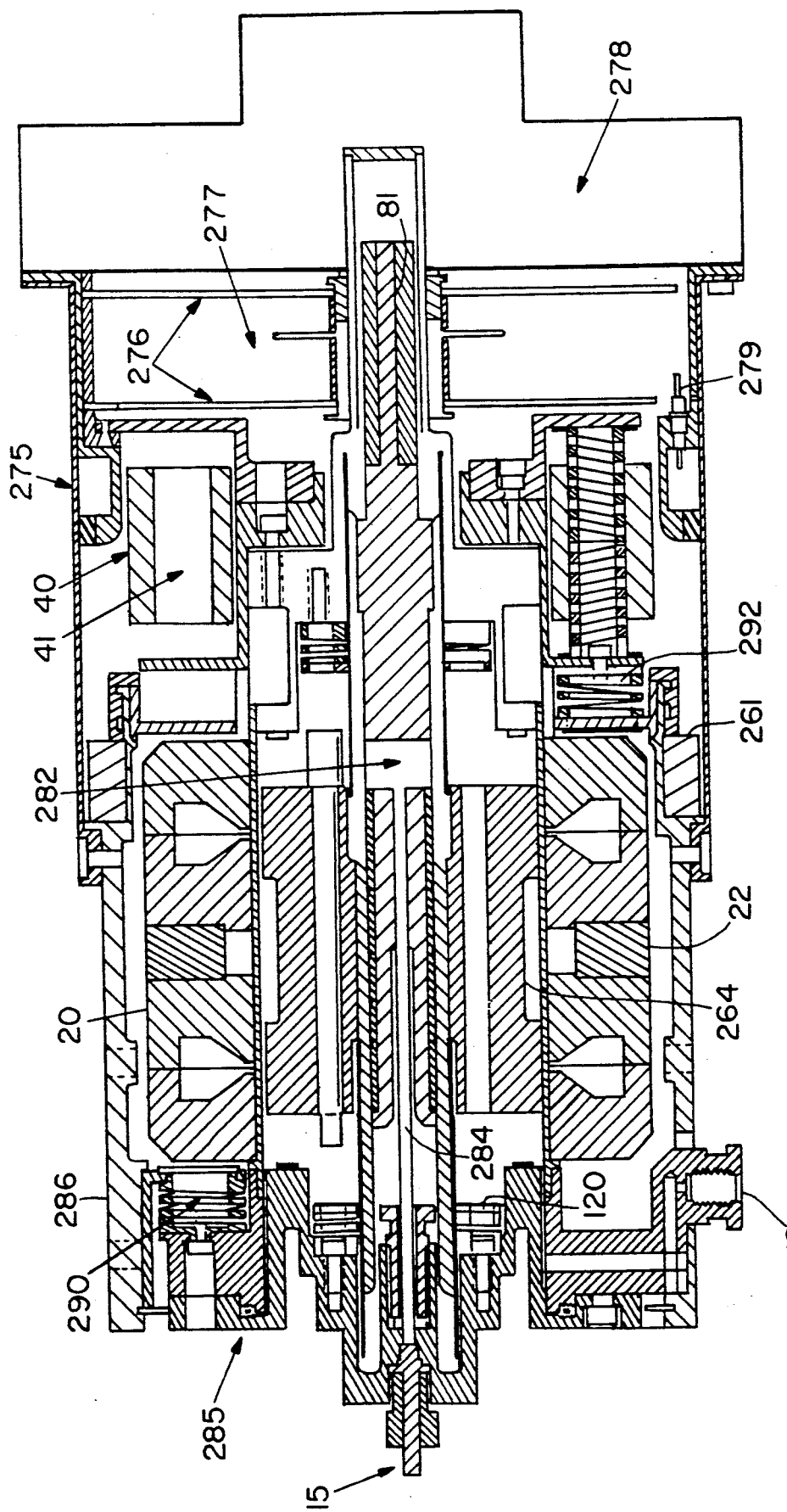
FIG. 6 is a cross-sectional view of another preferred embodiment of a linear drive assembly employing a machined spring isolation system.

Another embodiment of a linear drive assembly is illustrated in the cross-sectional view of FIG. 6. This embodiment incorporates a feedthrough 280 for the transmission of the working fluid of the compressor from the compression space 282, through the tubular quill 284, and into the cold finger assembly of the refrigerator.

This embodiment employs an isolation system comprised of six machined springs, two of which 290 and 292 are shown positioned along axes that are parallel to the linear axis of the assembly. These springs are mounted between the housing 285 of the assembly and the mounting frame 286 of the housing 285 thereby reducing or preventing the transmission of vibration between the mounting frame 286 and the linear drive assembly.

Figure 7:
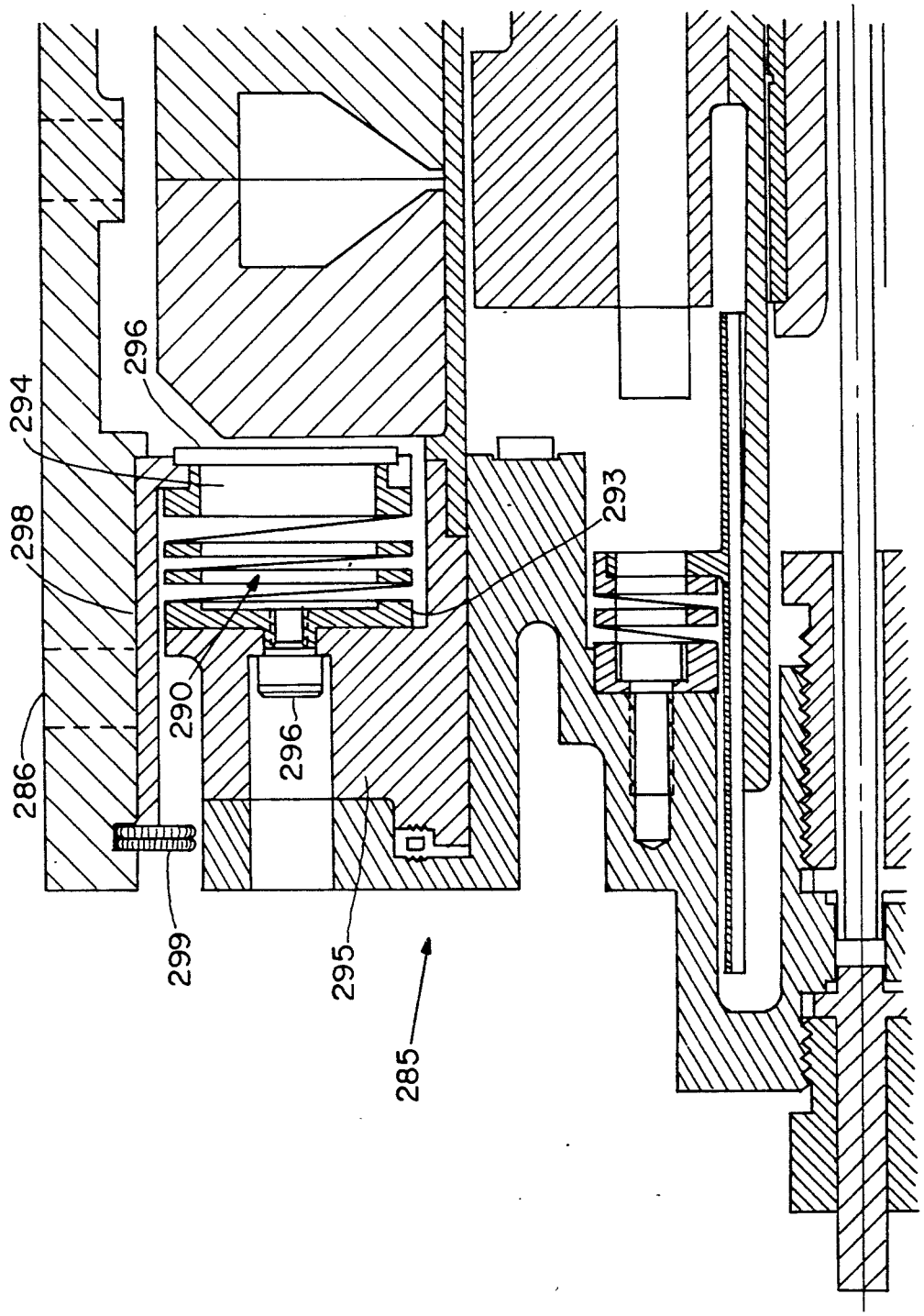
FIG. 7 is an enlarged detailed cross-sectional view of the machined isolator system of the system shown in FIG. 6.

An enlarged cross-sectional view of the machined isolation spring 290 and the spring mount are shown in FIG. 7. One end 294 of the machined spring is mounted to bumper 296 and flange 298. The flange 298 is secured to the frame 286 with a spring 299 shown in its fully compressed state that exerts an axial force on flange 298.

The opposite end 293 of the spring 290 is secured to the housing of the compressor at housing flange 295 with bolt 296.

The machined isolator spring 290 is used rather than a conventional coil spring. The machined spring isolators can be constructed to be very stiff in the radial direction relative to the linear axis of the compressor and soft along the axis of the spring thereby isolating vibration along the principle axis of the motor.

The machined springs 290, 292 are fabricated by grinding a solid cylinder. The axial and radial stiffness of the spring can thereby be controlled within much tighter tolerances which would be prohibitively expensive in the manufacture of conventional coiled springs.

Figure 8:
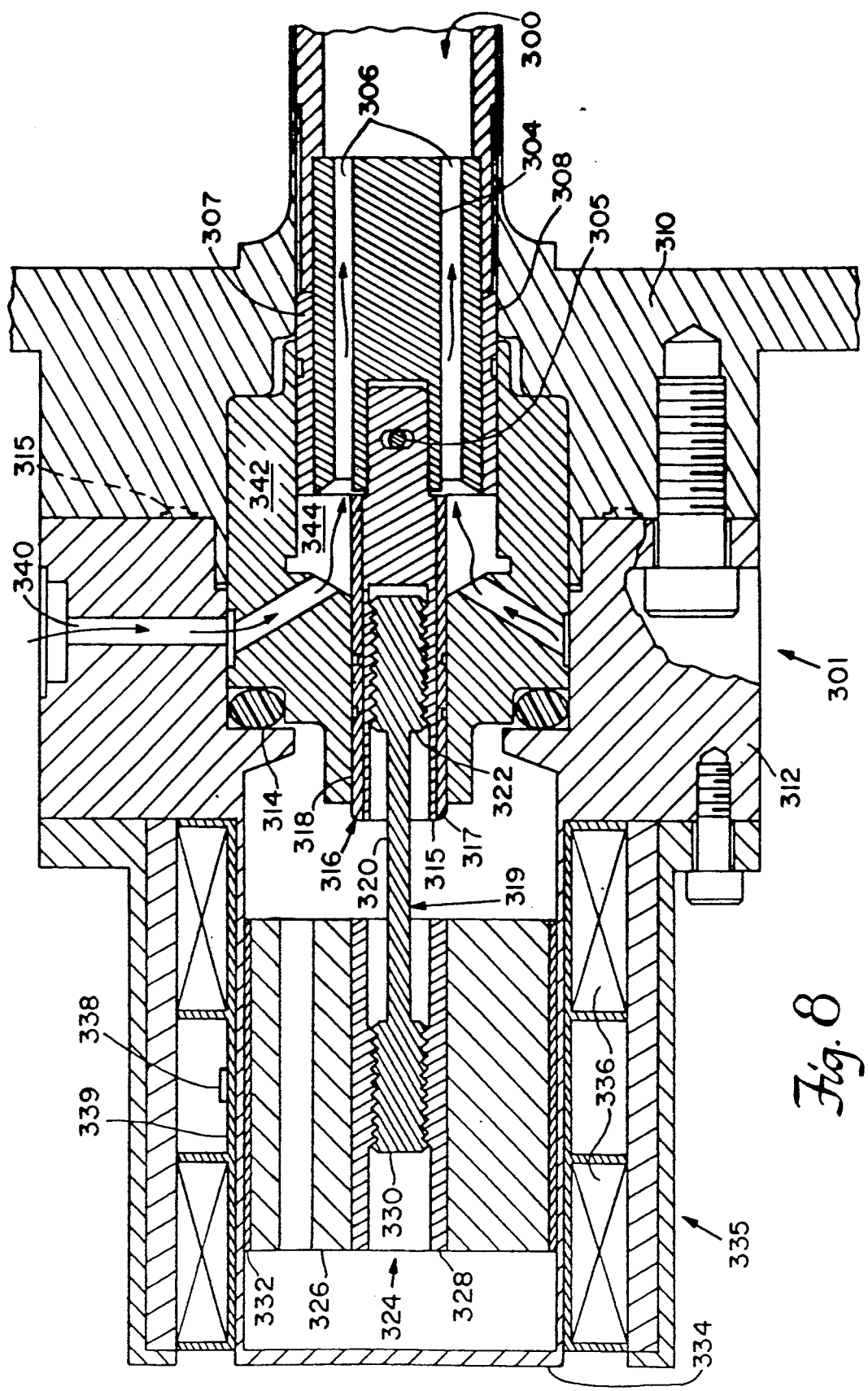
FIG. 8 is a cross-sectional view of a preferred embodiment of the piston coupling assembly in the cold finger of the refrigerator that is driven by a linear drive motor.

FIG. 8 illustrates a portion of a displacer assembly 300 within a cryogenic refrigerator employing a piston coupling assembly. A more detailed description of displacer operation can be found in U.S. Pat. No. 4,545,209 which is incorporated herein by reference. In this embodiment of the invention the armature 324 of a linear drive motor 335 is coupled to the displacer piston 316 by a flexible coupling member 320. The coupling member 320 has a first end portion 330 that is threaded and mates with an internally threaded region of cylinder 328 within armature 324. The second end portion 322 of the coupling member 320 is also threaded such that it mates with the internally threaded region of the inner cylinder 315 of the displacer piston 316. The coupling 324 and the cylinders 315 and 328 are preferably made of stainless steel, but any material having the necessary thermal and mechanical properties can be employed. The coupling member 320 reciprocates along the longitudinal axis of the displacer assembly in unison with the armature 324 and the displacer piston 316.

The armature 324 of the displacer drive motor has a magnetic cylinder 326 that is concentric about the internally threaded cylinder 328. An outer cylinder surface material 332 of the armature 324 forms a plain bearing with the inner surface of the rear housing 334 of the expander pressure vessel. The bearing can comprise a cylindrical sleeve that covers all of the outer surface of cylinder 326 or it can comprise one or more rings that extend about the cylinder 326 covering only a portion of its surface. This forms a "soft on hard" bearing that is described more fully below in connection with FIGS. 13 and 14.

A coil assembly 336 extending about the rear housing 334 is energized to provide a magnetic flux which drives the armature 324. A bobbin 339 supports the coils 336 and has a Hall effect position sensor 338 positioned to monitor armature operation.

The linear drive motor 335 serves to trim the motion of the displacer to assure full strokes without contact at the ends of the cold finger and to assure proper phase with the pressure wave that is transmitted through port 340 from the compressor.

An outer clearance seal element 342 is preferably made of ceramic or alumina and forms a first clearance seal 318 with the displacer piston 316 and a second clearance seal 308 with the cermet cylinder 307 that is secured to the displacer cylinder 302 by the stainless steel member 304. Member 304 has several holes extending longitudinally that provide fluid communication between the warm end 344 of the cold finger working volume and the regenerative heat exchanger positioned within the displacer cylinder 302. The clearance seals of the displacer can alternatively employ the "soft on hard" bearing referenced above and described further below in connection with FIGS. 13 and 14.

The member 304 is coupled to the displacer piston 316 in this embodiment by means of a pin 305 extending through a transverse slot at one end of the displacer piston 316. This pin 305 allows some radial accomodation between the displacer piston 316 and member 304.

A seal is formed between the rear housing 334 and the outer clearance seal element 342 using an o-ring gasket 314. The rear housing 334 also forms a sealed pressure vessel when it is coupled to the front outer housing 310 with bolts 311 and an indium seal 315.

The flexible coupling 320 between the armature 324 and the displacer piston 316 provides for universal radial compliance along the coupling 320 to substantially reduce cross-bearing loads that the outer cermet cylinder 317 of the displacer piston can exert on the outer clearance seal element 342. This serves to minimize wear along the clearance seal 318 and thus extend the operational lifetime of these components.

Figure 9:
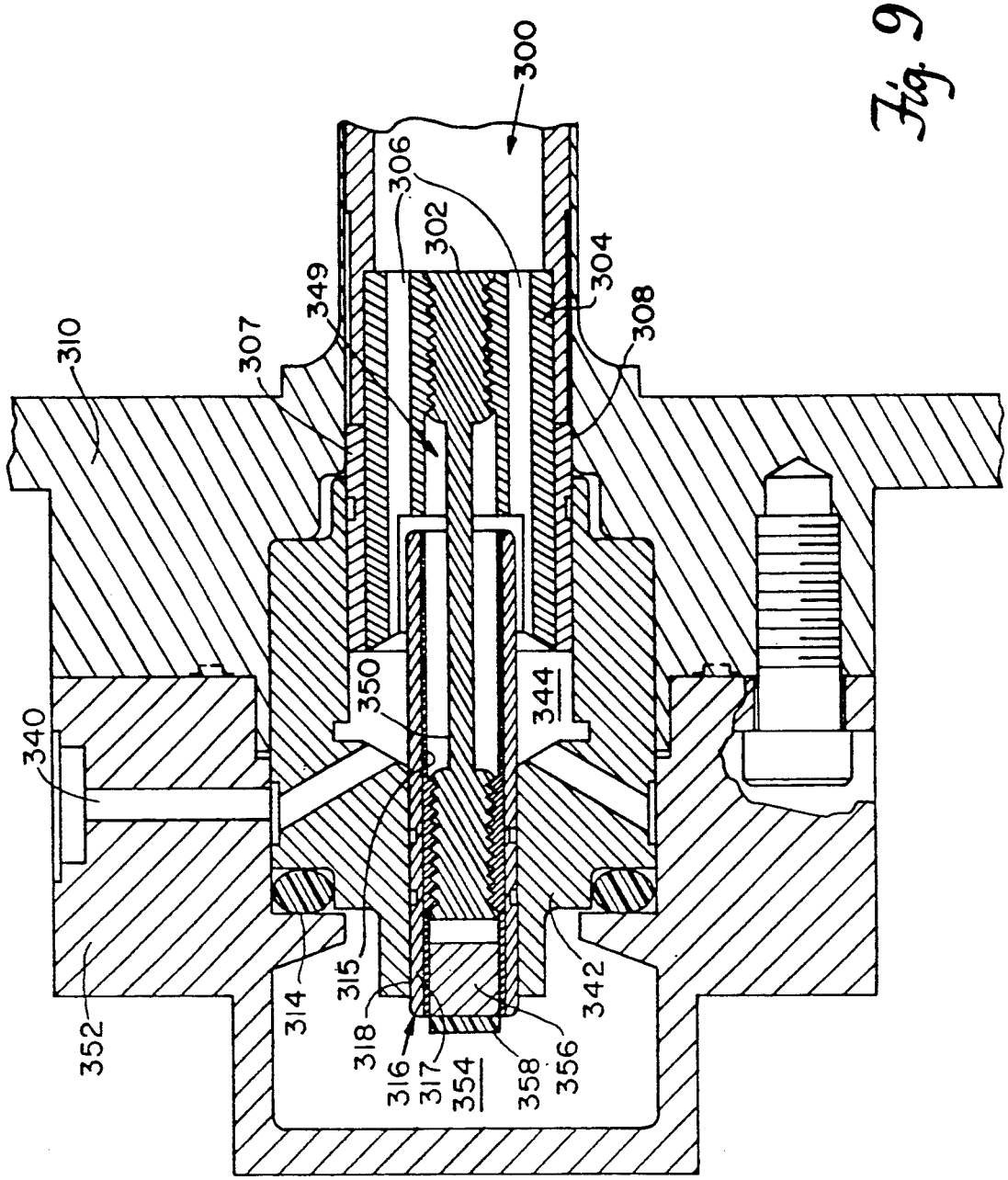
FIG. 9 is a cross-sectional view of a preferred embodiment of the piston coupling assembly of the displacer that employs a pneumatic volume.

Another preferred embodiment of a displacer assembly employing a flexible piston coupling is illustrated in FIG. 9. This embodiment does not employ a linear drive motor to trim the motion of the displacer, but relies upon the compression wave transmitted by the working fluid from the compressor to drive the displacer 300. A gas spring volume 354 within the rear housing element 352 serves to prevent the displacer piston 316 from striking the housing 352. The end of the displacer piston 316 extending into volume 354 is fitted with a plug 356 and a bumper 358 mounted thereon to prevent damage to the assembly in the event that the piston 316 does strike the housing 352. The piston 316 forms a clearance seal with the outer clearance seal element 342 and is coupled to the displacer member 304 with a flexible piston coupling 350. Thus, instead of the pin coupling 305 used in the embodiment of FIG. 8 to couple the displacer piston 316 to the displacer 300, the present embodiment utilizes a flexible coupling 350 that is threaded at both ends and secured therewith to the piston 316 and the displacer member 304. This structure provides for universal radial compliance between the displacer 300 and the displacer piston 316 not available with the pin coupling 305 previously in use.

Figure 10:
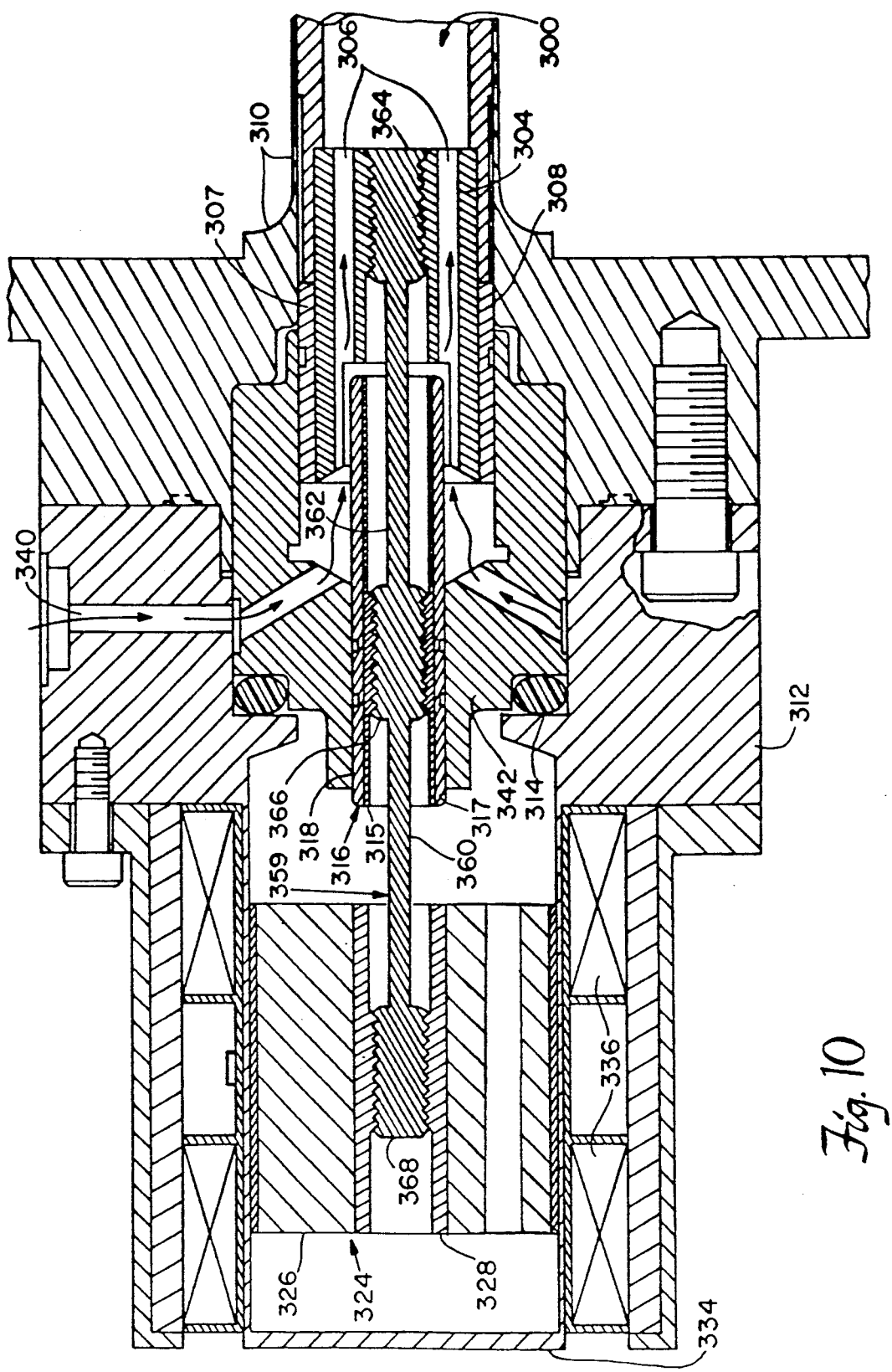
FIG. 10 is a cross-sectional view illustrating a preferred embodiment employing a double piston coupling in the cold finger.

FIG. 10 illustrates a preferred embodiment of a displacer assembly utilizing a dual flexible piston coupling system that combines the features employed in the embodiments of FIGS. 8 and 9.

In this embodiment, the piston coupling 359 has a first flexible region 360 between the armature 324 and the displacer piston 316 and a second flexible region between the displacer member 304 and the displacer piston 316. The flexible regions 360 and 362 have a reduced diameter to provide universal radial compliance between the coupled components. The piston coupling 359 has three larger diameter portions that are threaded externally to mate with the internally threaded cylinders 328 and 315 of the armature 324 and the piston 316, as well as the internally threaded portion of member 304. This dual piston coupling 359 provides improved radial compliance between the armature 324, the displacer piston 316 and the displacer 300 to substantially reduce radial loads on the clearance seals 308 and 318.

Figure 11:
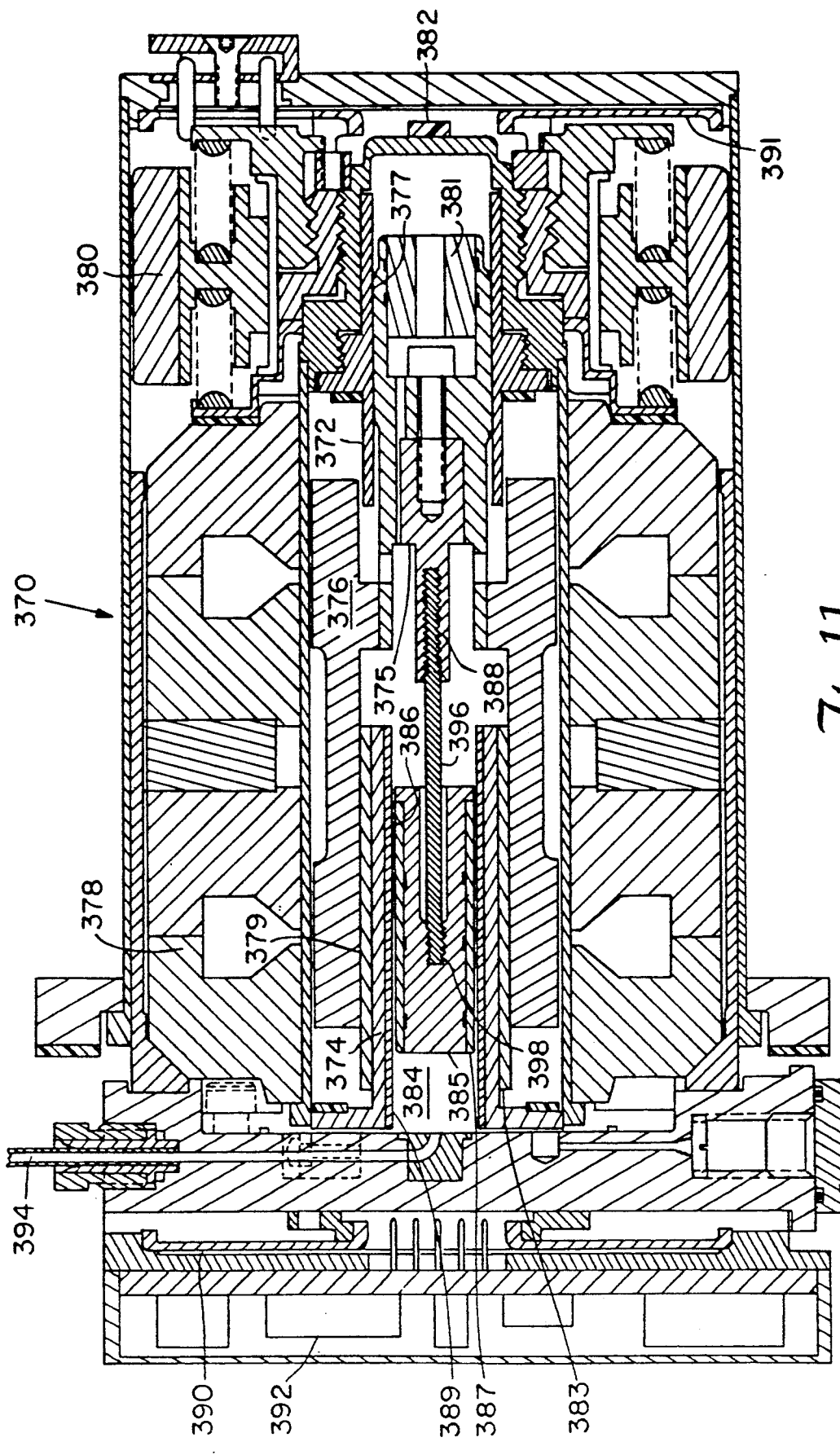
FIG. 11 is a cross-sectional view of a compressor with a reciprocating piston coupled to the armature of a linear drive motor by a flexible piston coupling.

A compressor 370 for a cryogenic refrigerator is shown in FIG. 11 that employs a linear drive motor with a reciprocating piston 368 to alternately compress and expand a working fluid in the compression space 384. Tube 394 provides fluid communication between the compression space 384 and the cold finger of the refrigerator. The outer cylindrical surface 387 of piston 368 forms a clearance seal 386 with the inner surface 389 of a stationary cylinder 374. The piston 385 is coupled to an armature assembly 375 by a flexible piston coupling 396. The coupling is threaded at one end 398 to engage an internally threaded bore within the piston 385, and is threaded at the opposite end 388 to engage an internally threaded portion of the armature assembly 375.

The armature assembly 375 includes a sensor magnet 381 positioned at one end of the armature opposite the coupling 396 that is used with position sensor 382 to monitor the position of the armature assembly 375. A magnetic armature 376 is mounted on assembly 375 and is driven by a coil assembly 378 that is concentric about the armature 376.

The outer cylindrical surface of armature assembly 375 forms a bearing 377 with a stiff rear bearing support 372. Support 372 is stiff relative to the spring mounted flexure bearing supports 110 shown in the embodiment of FIG. 1. A front bearing support 379 is formed by an internal surface of the armature 376, that is concentric about the stationary cylinder 374, and the outer surface of bearing sleeve 383 that is secured to cylinder 374.

The linear motor is mounted on front and rear isolator springs 390 and 391. A cavity in which the isolator 390 is mounted provides air cooling to the end of the compressor 370 adjacent the compression space 384. A support housing 392 mounted adjacent to the isolator 390 houses the motor electronics. At the opposite end of the compressor a dynamic absorber 380 is used to reciprocate out of phase with the armature assembly 375 and piston 385 to reduce the transmission of vibration to the system on which the compressor 370 is mounted.

Figure 12:
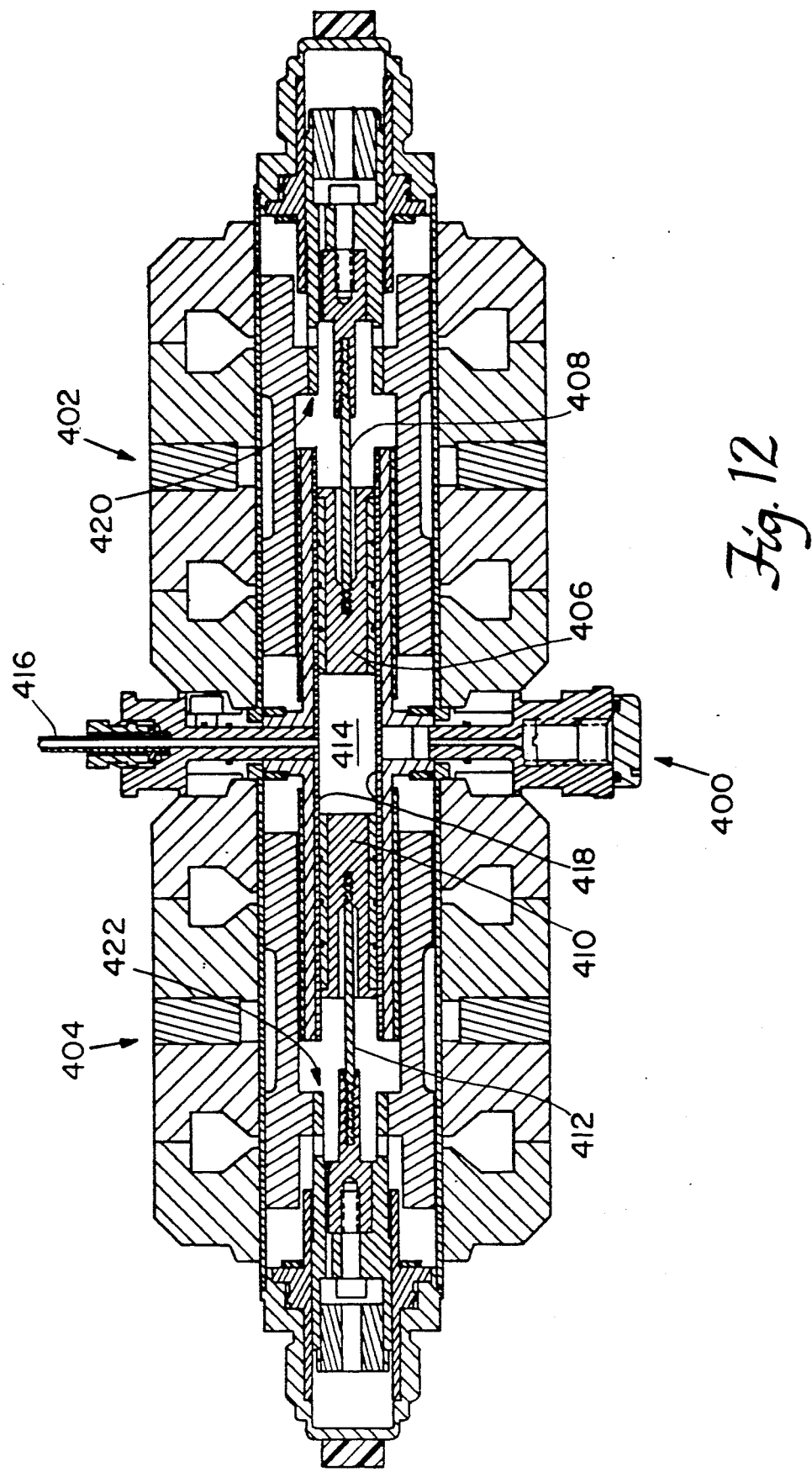
FIG. 12 is a cross-sectional view of a dual piston compressor employing flexible piston couplings.

Another preferred embodiment of a compressor 400 for a cryogenic regrigerator is illustrated in FIG. 12. In this embodiment a single compression space 414 is defined by dual mounted pistons 406 and 410 that reciprocate within a cylinder 418.

Each piston 406, 410 is coupled to an armature assembly 420 and 422 such as that shown in FIG. 11, by flexible piston couplings 408 and 412, respectively. Each piston 406, 410 and the assembly 420, 422 to which it is coupled are driven by coils to form dual linear drive motors 402, 404. The pistons 406 and 410 are driven 180 degrees out of phase such that a pressure wave is generated in a fluid in the compression space 414 and is transmitted in the fluid present in tube 416 to a cold finger connected to the compressor. As with the previous embodiments employing the flexible couplings 408, 412, these couplings provide universal radial compliance between the pistons and the armatures to which they are attached thereby reducing radial forces that would otherwise occur between the piston and the clearance seal.

Figure 13:
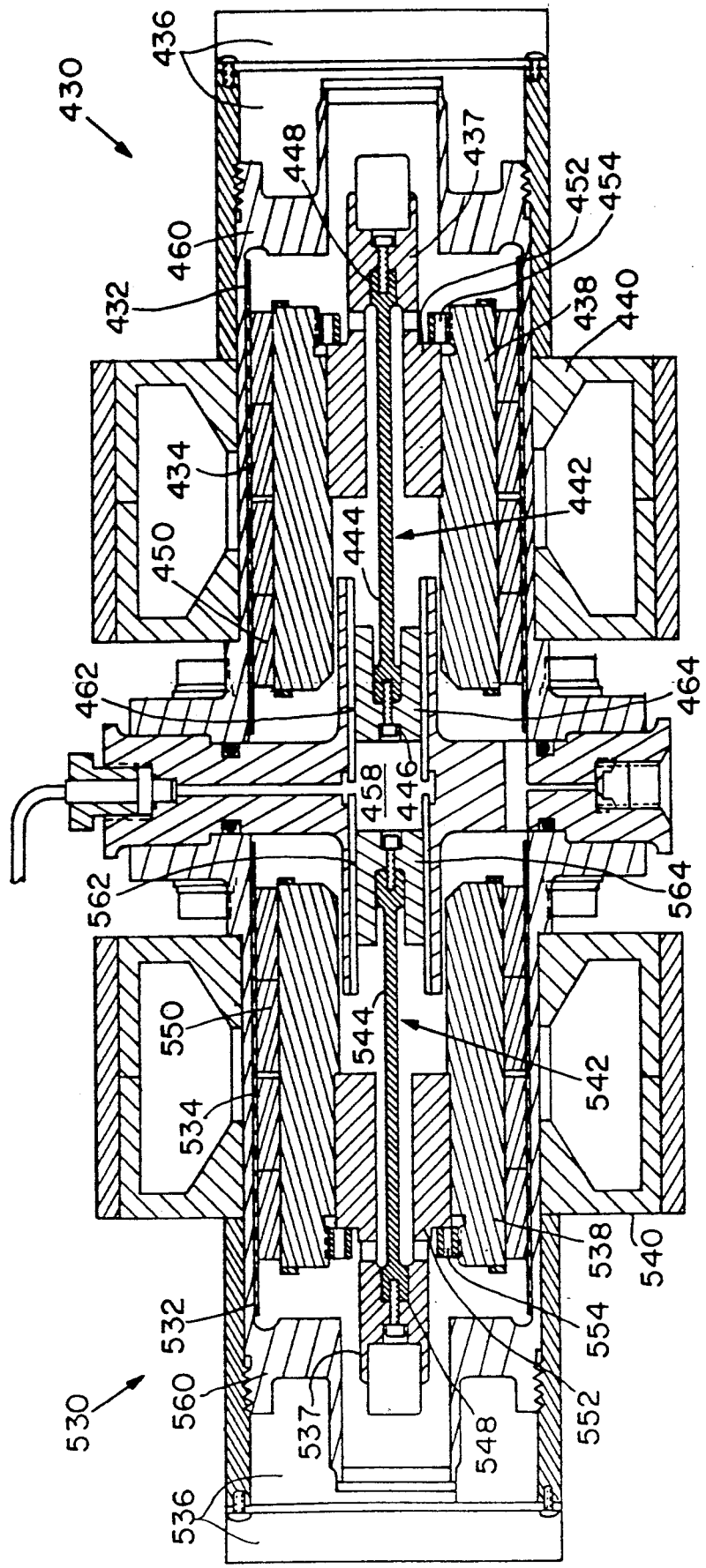
FIG. 13 is a cross-sectional view of a dual piston compressor having a sleeve support bearing extending between the armature and the housing in which the armature reciprocates.

Another preferred embodiment of the dual piston compressor is illustrated in the cross-sectional view of FIG. 13. Instead of using the support bearing 372, as shown in FIG. 11, at the end of each armature assembly, the present embodiment utilizes sleeve support bearings 432, 532 positioned in the air gap that exists in the other embodiments between the armature and the inner housing.

This air gap exists in the previous embodiments to minimize the obstruction of electromagnetic flux paths between the coil assembly and the magnetic armature.

The material used for the sleeve support bearing in the gap cannot be magnetic as it should not alter the flux path that extends through the gap. Various plastics including PTFE based polymers such as RULON ® are highly suitable for this application. These materials are machinable to precise tolerances and exhibit reduced wear and friction and are commercially available.

The motor design employs moving magnetic armature elements 438, 538 coupled to armature extensions 437, 537 by bolts 454, 537. The armature includes permanent magnetic rings 450, 550 that extend about the armature elements 438, 538. The flexible piston couplings 442, 542 have central flexible regions 444, 544 and are coupled to the armature extensions 437, 537 at ends 448, 548. The magnets 450, 550 are enclosed in a non-magnetic metallic sleeves 434, 534. The surface finish on the outside diameter of the sleeves 434, 534 are prepared such that it is smooth and uniform with the proper pattern for a mating soft bearing application. The soft RULON ® sleeve is applied to the armature sleeve 434, 534 or the inner surface of housing 460, 560 adjacent to the armature sleeves by an adhesive. This is followed by finish machining to the required dimensional and geometric tolerances. The soft sleeve should not extend to either side of the armature during any portion of the armature motion.

The advantages of this approach are that it allows for the elimination of the end support bearings and provides a substantial increase in the available surface area for bearing contact. The new load distribution will reduce wear on the clearance seal caused by sideloading thus providing a longer operating life. The shafts which had previously been used for the end bearing supports can be eliminated. One end of each piston/armature assembly is used for a floating piston clearance seal while the other is used for the location of an armature seal sensing machanism.

The gap bearing eases manufacture and reduces or eliminates possible wear conditions which could exist on the piston/bearing end of the assembly.

Figure 14:
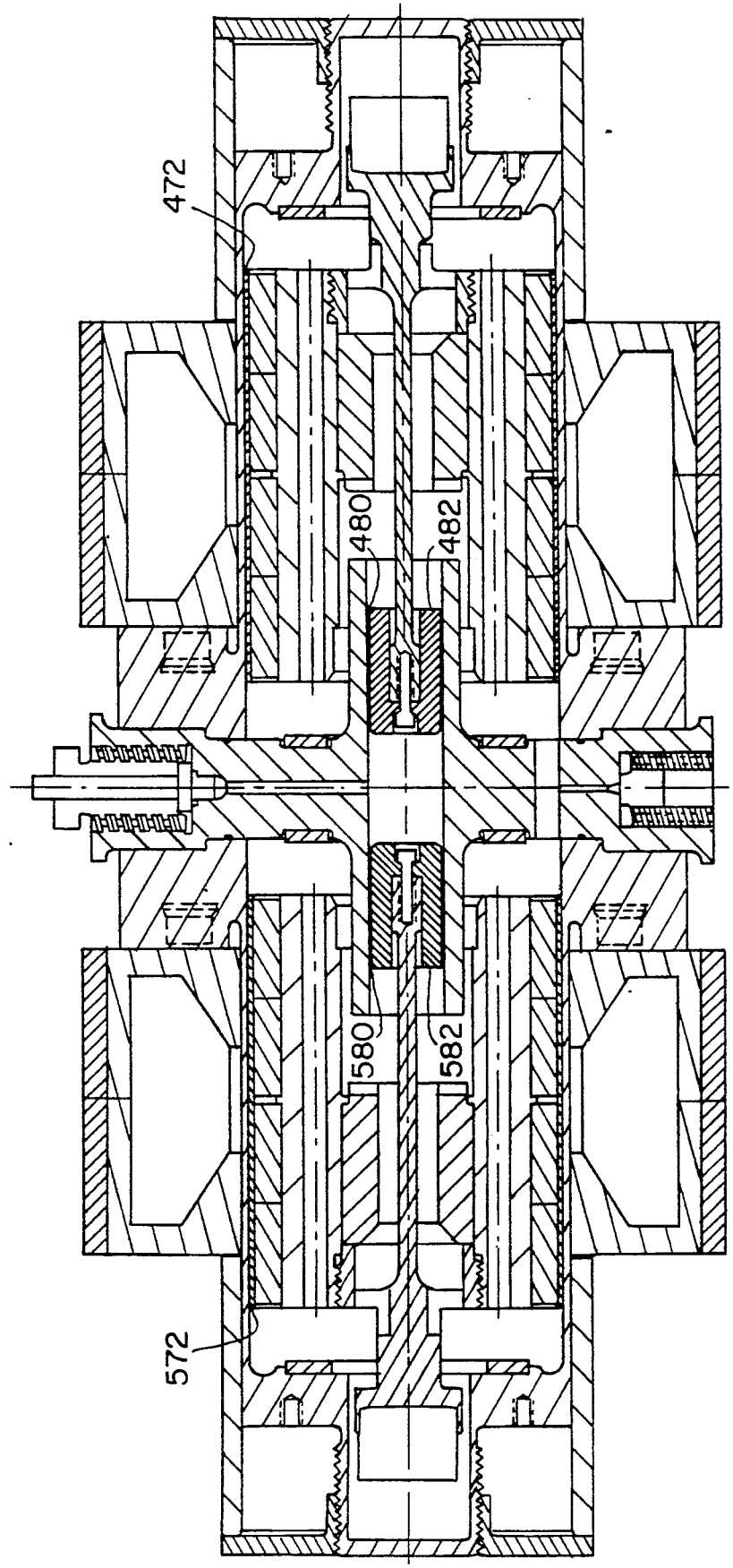
FIG. 14 is a cross-sectional view of a dual piston compressor having a sleeve support bearing secured to armature and to the armature piston at the clearance seal.

In FIG. 13, the sleeves 432, 532 are secured to the housing. In FIG. 14 the sleeves 472, 572 are secured to the reciprocating armature. Sleeves 472, 572 cover the entire outer cylindrical surface of the armature. The sleeves 472, 572 can alternatively comprise one or more rings that extend concentrically about the armature but do not cover the entire outer surface of the armature. The thickness of the rings (or the cylindrical sleeves) is in the range of $5 \times 10^{-3}$–$10 \times 10^{-3}$ inches to separate the outer surface of the armature from the housing and provides a surface have reduced friction and wear. The rings are preferably a soft plastic material as described above.

In addition, clearance seal sleeves 480, 580 can be secured to the outer surface of the armature pistons 482, 582 to form clearance seals with the hard anodized aluminum element 600 that also surrounds the compression space 602. Note that the above sleeve support bearings can also be employed in the displacers illustrated in FIGS. 8-10.

We claim:

1. A cryogenic refrigerator comprising a gaseous working fluid which is alternately compressed and expanded to cool a portion of the working fluid to cryogenic temperatures, the refrigerator having a linear drive motor comprising:
    a housing that seals the working fluid within a volume;
    a piston positioned within the housing along a longitudinal axis thereof, the piston having a clearance seal with, and having a linear reciprocating motion relative to, a clearance seal element;
    a flexible piston coupling secured at one end to the piston such that the piston coupling can undergo universal radial displacement relative to the longitudinal axis to maintain alignment of the piston with the clearance seal;
    a magnetic armature secured to a second end of the piston coupling;
    the armature extending concentrically about the coupling, the piston, and the clearance seal element; and
    a coil assembly concentric about the armature to drive the armature and the piston.

2. The cryogenic refrigerator of claim 1 wherein said clearance seal element comprises a stationary cylinder concentric about the piston, the clearance seal operating to seal a compression space in which the working fluid is compressed and expanded by the piston.

3. The cryogenic refrigerator of claim 1 wherein the piston comprises a reciprocating cylindrical head about which a sleeve extends, the flexible coupling connecting the head to a magnetic armature for a linear drive motor.

4. The cryogenic refrigerator of claim 3 wherein the cylindrical head has a larger diameter than the diameter of the flexible coupling.

5. The cryogenic refrigerator of claim 1 wherein the coupling support assembly comprises a reciprocating displacer within a cold finger of the refrigerator.

6. The cryogenic refrigerator of claim 1 wherein the coupling support assembly is secured to the housing such that the piston is stationary along the axis.

7. A dual piston linear drive motor comprising:
    a first piston and a second piston reciprocating within a cylinder to define a compression space there between in which a fluid is compressed and expanded;
    a first magnetic armature coupled to the first piston by a first flexible piston coupling and a second magnetic armature coupled to the second piston by a second flexible piston coupling such that each piston coupling bends to reduce radial forces exerted by the first and second pistons on clearance seals located between the cylinder and the first and second pistons;
    a first coil assembly surrounding the first armature to drive the first armature; and a second coil assembly surrounding the second armature to drive the second armature.

8. The linear drive motor of claim 7 wherein the first and second pistons reciprocate along an axis with opposite phase.

9. The linear drive motor of claim 7 wherein the motor operates as a compressor for a cryogenic refrigerator.

10. The linear drive motor of claim 9 wherein the cryogenic refrigerator further comprises a displacer reciprocating within a cold finger of the refrigerator.

11. The linear drive motor of claim 10 further comprising a displacer piston forming a clearance seal with the clearance seal element, the piston being coupled to the displacer by a flexible displacer piston coupling that permits universal radial displacement of the displacer piston relative to the displacer.

12. The linear drive motor of claim 10 further comprising a displacer drive motor having a linearly reciprocating armature coupled to the displacer by a radially flexible coupling that permits universal radial displacement of the armature relative to a displacer axis along which the displacer reciprocates.

13. A cryogenic refrigerator having a gas displacer which reciprocates in a housing to displace gaseous fluid in a working volume through a regenerator, the displacer comprising a displacer piston that is coupled to a displacer cylinder along an axis by a flexible piston coupling that provides for universal radial displacement of the coupling relative to the axis.

14. The cryogenic refrigerator of claim 13 further comprising a linear drive motor to drive the displacer, the motor having an armature reciprocating along the axis that is coupled to the displacer piston by a second flexible piston coupling.

15. The cryogenic refrigerator of claim 13 further comprising a compressor having a linear drive motor, the motor comprising:
 a compressor piston positioned along an axis of a compressor housing and forming a clearance seal with a clearance seal element;
 a flexible compressor piston coupling secured to the compressor piston that bends relative to the axis to reduce radial forces exerted by the piston on the clearance seal; and
 a coupling support that is secured to the compressor piston coupling opposite from the compressor piston.

16. The cryogenic refrigerator of claim 15 wherein the coupling support is secured to the housing.

17. The cryogenic refrigerator of claim 15 wherein the coupling support comprises a reciprocating magnetic armature.

18. A cryogenic refrigerator having a gaseous working fluid which is alternately compressed and expanded to cool a portion of the working fluid to cryogenic temperatures, the refrigerator comprising:
 a compressor housing that seals the working fluid within a volume;
 a first piston and a second piston reciprocating within a cylinder to define a compression space there between in which a fluid is compressed and expanded;
 a first magnetic armature coupled to the first piston by a first flexible piston coupling and a second magnetic armature coupled to the second piston by a second flexible piston coupling such that each piston coupling bends to reduce radial forces exerted by the first and second pistons on clearance seals located between the cylinder and the first and second pistons
 a first coil assembly surrounding the first armature to drive the first armature;
 a second coil assembly surrounding the second armature to drive the second armature;
 a gas displacer within a cold finger of the refrigerator and having a displacer volume in fluid communication with the compressor volume and comprising a displacer piston reciprocating along an axis, the displacer piston being coupled to a displacer by a third flexible piston coupling that provides for universal radial displacement of the coupling relative to the axis.

19. The cryogenic refrigerator of claim 18 further comprising a pneumatic volume in which one end of the displacer piston reciprocates.

20. The cryogenic refrigerator of claim 18 further comprising a displacer drive motor having a linear reciprocating armature coupled to the displacer piston by a fourth flexible piston coupling.

21. A gas displacer for a refrigerator in which the gas displacer reciprocates in a housing to displace gas in a working volume of pressurized gas through a regenerator, the gas displacer comprising:
 a working volume within a housing of the gas displacer through which the pressurized gas flows;
 a displacer reciprocating within an expander cylinder, the displacer having a regenerative matrix to absorb heat from the gas; and
 a flexible coupling that is coupled to the displacer at one end, and to a reciprocating element at the opposite end, the flexible coupling reciprocating along a longitudinal axis of the gas displacer and providing for universal radial displacement of the coupling relative to the axis.

22. The gas displacer of claim 21 further comprising a compressor for a cryogenic refrigerator.

23. The gas displacer of claim 21 wherein the refrigerator further comprises a stirling cycle cryogenic refrigerator.

24. The gas displacer of claim 21 wherein the reciprocating element comprises a displacer piston, the displacer piston having an outer cylindrical surface that forms a clearance seal with a clearance seal element.

25. The gas displacer of claim 21 wherein the reciprocating element comprises a reciprocating armature of a linear drive motor that surrounds the armature, the drive motor operating to drive the displacer through the flexible coupling.

26. The gas displacer of claim 25 wherein the flexible coupling is coupled to the displacer through a displacer piston that reciprocates relative to a clearance seal element that forms a clearance seal with the piston.

27. The gas displacer of claim 21 wherein the reciprocating element comprises a displacer piston, an armature driven by a linear drive motor, and a second flexible coupling secured at one end to the displacer piston and secured at the opposite end to the armature such that the second flexible coupling provides a universal radial displacement of the armature and the piston relative to the longitudinal axis.

28. A linear drive motor for a cryogenic refrigerator in which a gaseous working fluid is alternately compressed and expanded to cool a portion of the working fluid to cryogenic temperatures, the refrigerator comprising:

a housing that seals the working fluid within a volume;

a piston positioned within the housing along a longitudinal axis thereof, the piston forming a clearance seal with, and having a linear reciprocating motion relative to, a clearance seal element;

a magnetic armature secured to the piston, the armature reciprocating concentrically within a coil assembly that surrounds the housing; and a sleeve support bearing positioned between an outer cylindrical surface of the armature and an inner cylindrical surface of the housing such that the sleeve support bearing supports the armature during its reciprocating movement relative to the housing.

29. The linear drive motor of claim 28 further comprising a second piston that defines a compression space with the piston, the second piston being coupled to a second armature that reciprocates within a second sleeve support bearing.

30. The linear drive motor of claim 28 further comprising a flexible piston coupling that secures the piston to the armature.

31. The linear drive motor of claim 28 wherein the sleeve support bearing comprises a soft sleeve that is secured to the armature.

32. The linear drive motor of claim 28 wherein the sleeve support bearing comprises a soft sleeve that is secured to the inner cylindrical surface of the housing.

33. The linear drive motor of claim 28 wherein the sleeve support bearing comprises a soft sleeve of plastic material.

34. The linear drive motor of claim 28 wherein the clearance seal comprises a second sleeve support bearing positioned between an outer surface of the piston and an inner surface of the clearance seal element.

35. The linear drive motor of claim 34 wherein the second sleeve support bearing comprises a soft sleeve secured to the piston or to the clearance seal element.

36. The linear drive motor of claim 28 wherein the sleeve support bearing comprises a cylindrical sleeve extending along a longitudinal length of the armature to cover the outer cylindrical surface of the armature.

37. The linear drive motor of claim 28 wherein the sleeve support bearing comprises at least one ring extending concentrically about the armature.

* * * * *